US012573755B2

(12) United States Patent
Chang et al.

(10) Patent No.: US 12,573,755 B2
(45) Date of Patent: Mar. 10, 2026

(54) DUAL-BAND DIPOLE ANTENNA AND ELECTRONIC DEVICE

(71) Applicant: LUXSHARE PRECISION INDUSTRY COMPANY LIMITED, Shenzhen (CN)

(72) Inventors: Yao-Yuan Chang, Taipei (TW); Yu-Tsung Wang, Taipei (TW); Wei-Hsin Chen, Taipei (TW)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 39 days.

(21) Appl. No.: 18/829,851

(22) Filed: Sep. 10, 2024

(65) Prior Publication Data

US 2025/0219292 A1 Jul. 3, 2025

(30) Foreign Application Priority Data

Dec. 27, 2023 (CN) ......................... 202311836081.4

(51) Int. Cl.
*H01Q 5/48* (2015.01)
*H01Q 5/50* (2015.01)
(Continued)

(52) U.S. Cl.
CPC ................. *H01Q 5/48* (2015.01); *H01Q 5/50* (2015.01)

(58) Field of Classification Search
CPC .......... H01Q 1/243; H01Q 21/28; H01Q 9/42; H01Q 21/24; H01Q 13/085; H01Q 1/521;
(Continued)

(56) References Cited

U.S. PATENT DOCUMENTS 8,593,363 B2 11/2013 McLean et al.
8,723,750 B2 5/2014 Podduturi
(Continued)

FOREIGN PATENT DOCUMENTS

CN 1992431 A 7/2007
CN 101617439 A 12/2009
(Continued)

OTHER PUBLICATIONS

Taiwanese Office Action and Search Report for Taiwanese Application No. 113107520, dated Jul. 7, 2025, with English translation.

*Primary Examiner* — Wei (Victor) Y Chan
(74) *Attorney, Agent, or Firm* — Birch, Stewart, Kolasch & Birch, LLP

(57) ABSTRACT

Disclosed is a dual-band dipole antenna including a dielectric carrier with a first surface, a first radiator, a second radiator, a coupled radiator, a coaxial cable and a balun line. The first radiator and the second radiator in opposite areas of the first surface have different structural shapes. The coupled radiator on the first surface extends from the second radiator toward the first radiator. There is a coupling slot between the coupled radiator and the first radiator. An inner conductor and an outer conductor of the coaxial cable are electrically connected to the second radiator and the first radiator respectively. The balun line disposed on the first surface has a serpentine structure, and is connected to the first radiator and the second radiator. The first radiator, the second radiator and the coupled radiator are configured to generate a first resonance mode, a second resonance mode and a third resonance mode.

20 Claims, 17 Drawing Sheets

(51) Int. Cl.
*H01Q 9/42* (2006.01)
*H01Q 21/28* (2006.01)

(58) Field of Classification Search
CPC ........... H01Q 1/38; H01Q 21/30; H01Q 5/40; H01Q 9/285; H01Q 1/246; H01Q 1/48
See application file for complete search history.

(56) References Cited

U.S. PATENT DOCUMENTS

| | | | | |
|---|---|---|---|---|
| 8,982,006 | B2 | 3/2015 | Wang et al. | |
| 2018/0138595 | A1 * | 5/2018 | Nysen | H01Q 1/38 |
| 2021/0305722 | A1 * | 9/2021 | Zhang | H01Q 21/26 |
| 2022/0037767 | A1 * | 2/2022 | Yun | H01Q 1/2291 |
| 2024/0387994 | A1 * | 11/2024 | Chang | H01Q 1/50 |

FOREIGN PATENT DOCUMENTS

| | | | |
|---|---|---|---|
| CN | 102916244 | A | 2/2013 |
| TW | 200836405 | A | 9/2008 |
| TW | 200901568 | A | 1/2009 |
| TW | 201025735 | A1 | 7/2010 |

* cited by examiner

DUAL-BAND DIPOLE ANTENNA AND ELECTRONIC DEVICE

CROSS REFERENCE TO RELATED PRESENT DISCLOSURE

This application claims the priority benefit of Chinese Patent Application Serial Number 202311836081.4, filed on Dec. 27, 2023, the full disclosure of which is incorporated herein by reference.

TECHNICAL FIELD

The present disclosure relates to the field of wireless communication technology, in particular to a dual-band dipole antenna and an electronic device.

RELATED ART

The antenna used to send and receive radio frequency signals is one of the most important components in a wireless communication device. In order to obtain better communication quality, the wireless communication device usually uses a symmetrically designed dual-band dipole antenna to provide good antenna bandwidth and radiation pattern at high and low frequencies.

With the rapid development of wireless radio frequency technology, current wireless communication devices need to use large bandwidth for high-speed wireless transmission. Therefore, multi-input multi-output (MIMO) technology is usually used to improve the transmission rate. However, MIMO technology needs to increase the channel bandwidth by improving the isolation between the two antennas and reducing the channel correlation, but the symmetrically designed dual-band dipole antenna needs to be separated from other dual-band dipole antennas by a certain distance to meet the isolation requirement, which indirectly lead to the over-sizing of wireless communication devices, resulting in a waste of space and an increase in cost.

SUMMARY

The embodiments of the present disclosure provide a dual-band dipole antenna and an electronic device, which can solve the problems that the current wireless communication devices cannot meet the development requirements of being light, thin, short and small, the internal space is wasted, and the production cost is increased since a symmetrically designed dual-band dipole antenna arranged in the wireless communication device using the MIMO technology needs to be separated from other dual-band dipole antennas by a certain distance to meet the isolation requirement.

In order to solve the above technical problems, the present disclosure is implemented as follows:

The present disclosure provides a dual-band dipole antenna, which includes a dielectric carrier, a first radiator, a second radiator, a coupled radiator, a coaxial cable and a balun line, wherein the dielectric carrier includes a first surface; the first radiator and the second radiator are disposed in opposite areas of the first surface and have different structural shapes; the coupled radiator is disposed on the first surface and extends from the second radiator toward the first radiator, there is a coupling slot between the coupled radiator and the first radiator; the coaxial cable includes an inner conductor, a first insulating layer, an outer conductor and a second insulating layer; the first insulating layer covers a portion of a surface of the inner conductor, so that one end of the inner conductor is exposed, and the exposed inner conductor is electrically connected to the second radiator; the outer conductor covers a portion of a surface of the first insulating layer; the second insulating layer covers a portion of a surface of the outer conductor, so that a portion of the outer conductor is exposed, and the exposed outer conductor is electrically connected to the first radiator; the balun line has a serpentine structure and is disposed on the first surface, one end of the balun line is connected to the first radiator, and the other end of the balun line is connected to the second radiator; the first radiator, the second radiator and the coupled radiator are configured to generate a first resonance mode, a second resonance mode and a third resonance mode.

The present disclosure provides an electronic device, which includes two dual-band dipole antennas of the present disclosure, wherein one dual-band dipole antenna is rotated 180 degrees relative to the other dual-band dipole antenna, or the structures of the two dual-band dipole antennas are arranged in a mirror image.

In the embodiments of the present disclosure, through the asymmetric structural design of the first radiator, the second radiator and the coupled radiator, the dual-band dipole antenna has an asymmetric radiation pattern at both high frequency (e.g., 5.5 GHz frequency band) and low frequency (e.g., 2.45 GHz frequency band). At the same time, by the serpentine structure of the balun line, good high-frequency and low-frequency matching is achieved, and the size of the dual-band dipole antenna is greatly reduced. In addition, by flipping the structure of the dual-band dipole antenna up and down and/or left and right, when the dual-band dipole antenna is applied to an electronic device with a multi-antenna architecture, the dual-band dipole antenna of the present disclosure can meet the isolation requirement with a shorter antenna spacing distance compared to the dual-band dipole antenna with a symmetrical design.

BRIEF DESCRIPTION OF THE DRAWINGS

Accompanying drawings described herein are intended to provide a further understanding of the present disclosure and form a part of the present disclosure, and exemplary embodiments of the present disclosure and descriptions thereof are intended to explain the present disclosure but are not intended to unduly limit the present disclosure. In the drawings.

DETAILED DESCRIPTION OF THE EMBODIMENTS

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as "directly connected" or "directly coupled" to another element, there is no intervening element therebetween.

Figure 1:
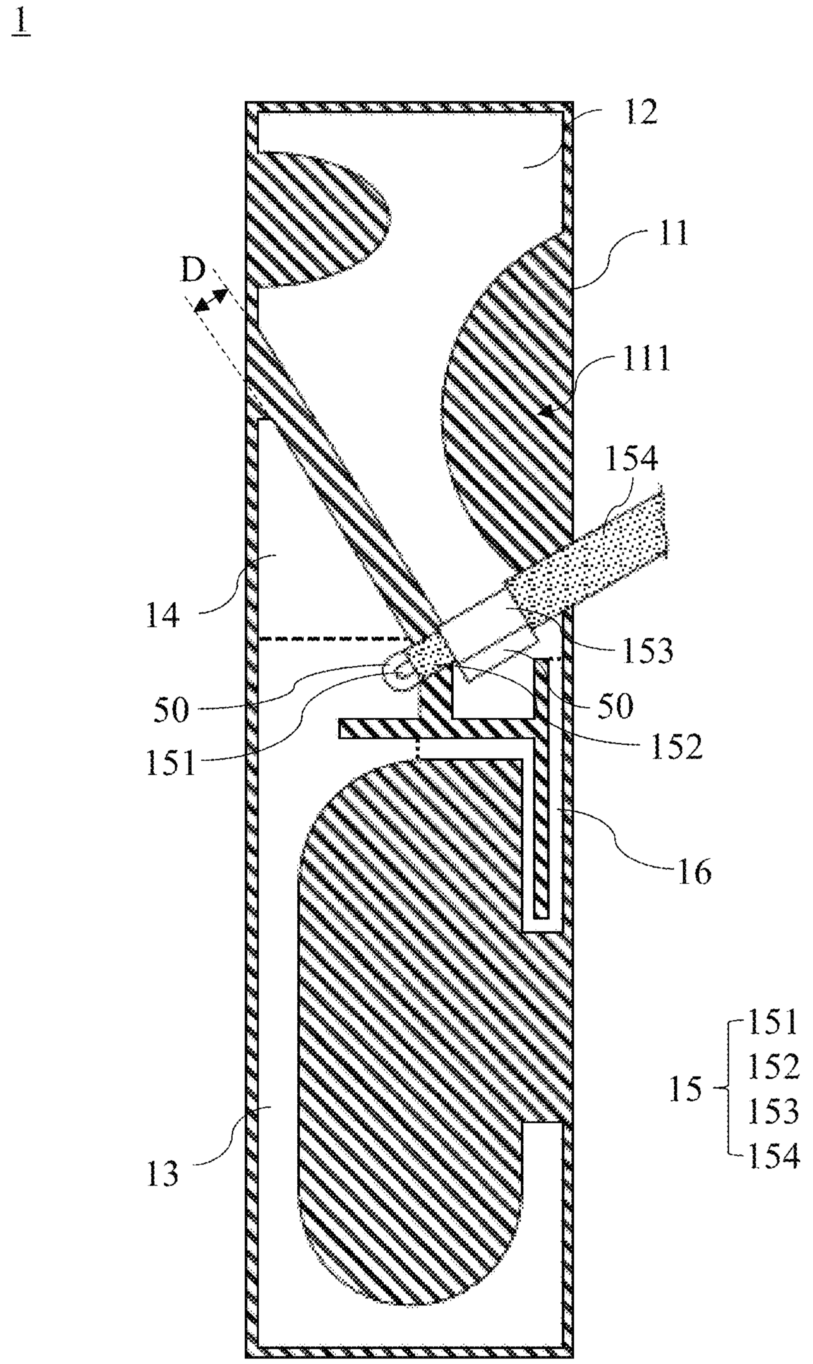
FIG. 1 is a top view of a dual-band dipole antenna according to an embodiment of the present disclosure.
Figure 2:
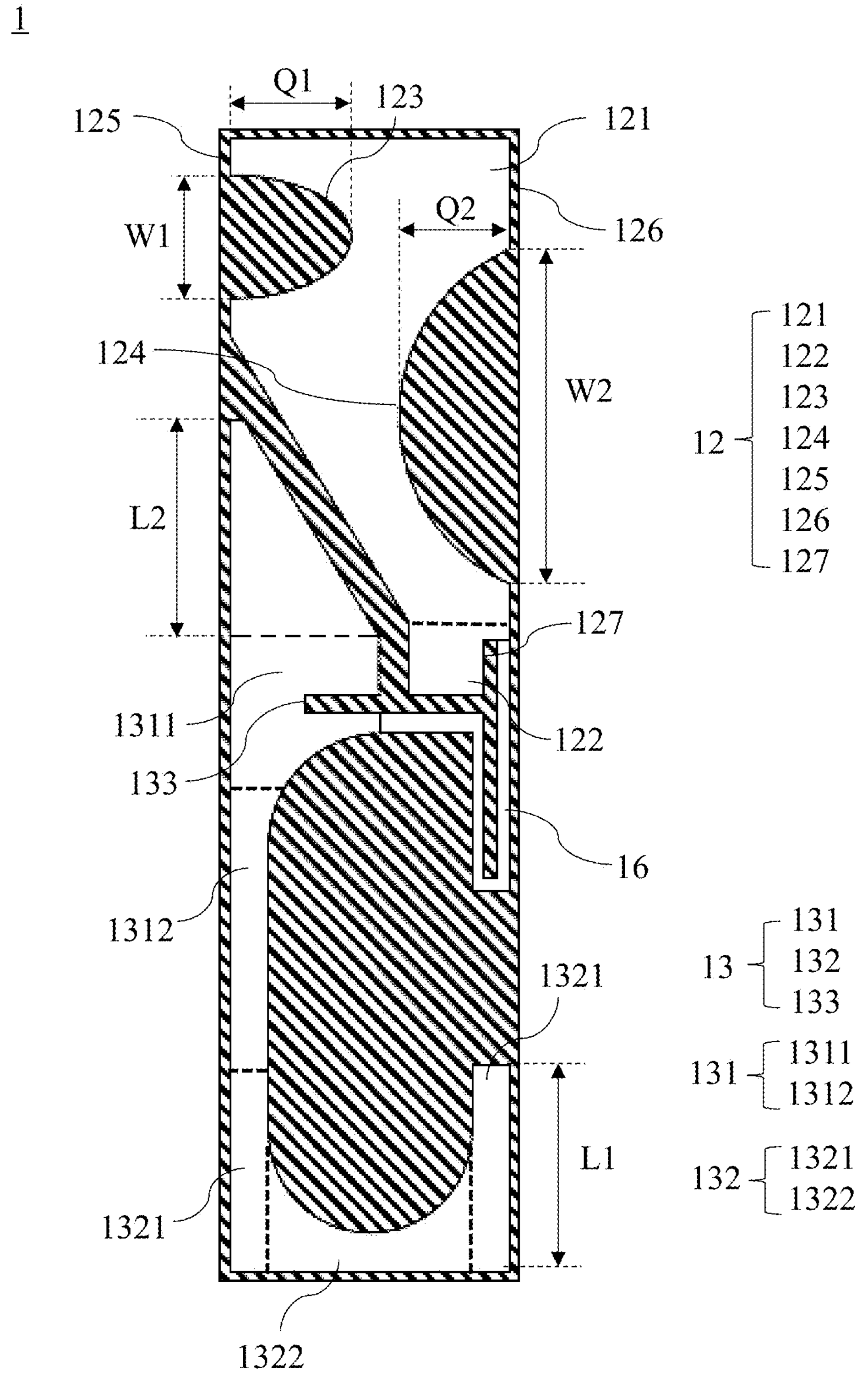
FIG. 2 is a schematic diagram of an embodiment of the dual-frequency dipole antenna of FIG. 1 with the coaxial cable removed.

Please refer to FIG. 1 and FIG. 2, wherein FIG. 1 is a top view of a dual-band dipole antenna according to an embodiment of the present disclosure, and FIG. 2 is a schematic diagram of an embodiment of the dual-frequency dipole antenna of FIG. 1 with the coaxial cable removed. As shown in FIG. 1 and FIG. 2, a dual-band dipole antenna 1 comprises a dielectric carrier 11, a first radiator 12, a second radiator 13, a coupled radiator 14, a coaxial cable 15 and a balun line 16. The dielectric carrier 11 may be a flexible board or a rigid board, the rigid board may be, but not limited to, a Flame Retardant 4 (FR4) substrate or a printed circuit board (PCB), and the flexible board may be, but not limited to, a flexible printed circuit (FPC). The first radiator 12, the second radiator 13 and the coupled radiator 14 may all be made of metal materials, such as copper, silver, aluminum, iron, or alloys thereof.

Figure 3:
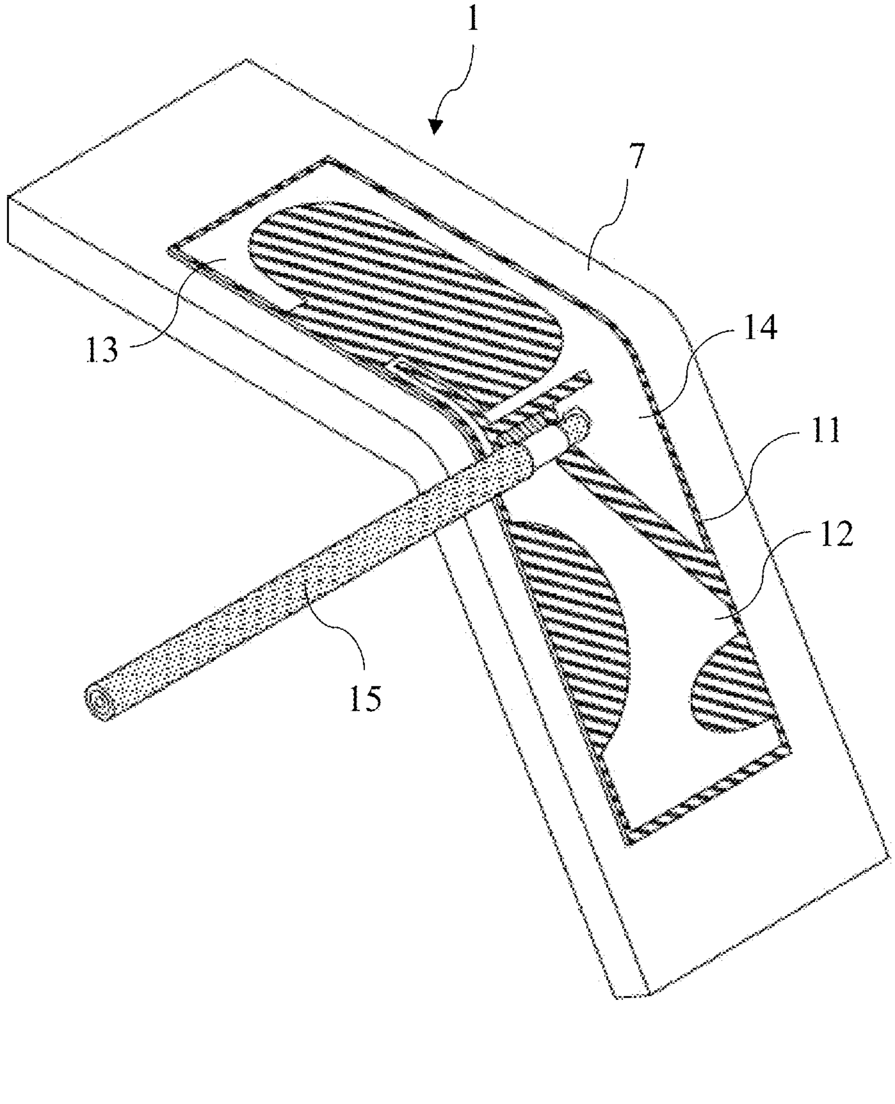
FIG. 3 is a schematic diagram of a dual-band dipole antenna attached to a surface of an object according to an embodiment of the present disclosure.

The dielectric carrier 11 comprises a first surface 111. The first radiator 12 and the second radiator 13 are disposed in opposite areas of the first surface 111, and the first radiator 12 and the second radiator 13 have different structural shapes. The coupled radiator 14 is disposed on the first surface 111, the coupled radiator 14 extends from the second radiator 13 toward the first radiator 12, and there is a coupling slot D between the coupled radiator 14 and the first radiator 12. That is to say, the first radiator 12, the second radiator 13 and the coupled radiator 14 are disposed on the same surface of the dielectric carrier 11 (i.e., the first surface 111), so the dielectric carrier 11 may be, but not limited to, a single-sided board, thereby reducing the production cost of the dual-band dipole antenna 1. At the same time, the dual-band dipole antenna 1 can be configured in a wireless communication device by providing a backing adhesive on the surface opposite to the first surface 111, and the backing adhesive will not affect the radiation characteristics of the dual-band dipole antenna 1. In addition, when the dielectric carrier 11 is a flexible single-sided board, the dual-band dipole antenna 1 may be attached to different types of surfaces 7 through the backing adhesive (as shown in FIG. 3, which is a schematic diagram of a dual-band dipole antenna attached to a surface of an object according to an embodiment of the present disclosure). It should be noted that the dielectric carrier 11 in FIG. 1 and FIG. 2 may be a single-sided board, so only the top view of the dual-band dipole antenna 1 is drawn to illustrate the embodiment.

The coaxial cable 15 comprises an inner conductor 151, a first insulating layer 152, an outer conductor 153 and a second insulating layer 154. The first insulating layer 152 covers a portion of a surface of the inner conductor 151, so one end of the inner conductor 151 is exposed, and the exposed inner conductor 151 is electrically connected to the second radiator 13. The outer conductor 153 covers a portion of a surface of the first insulating layer 152. The second insulating layer 154 covers a portion of a surface of the outer conductor 153, so a portion of the outer conductor 153 is exposed, and the exposed outer conductor 153 is electrically connected to the first radiator 12. The inner conductor 151 may be, but not limited to, a silver-plated copper conductor, the first insulating layer 152 may be, but not limited to, a polytetrafluoroethylene insulating layer, the outer conductor 153 may be, but not limited to, a silver-plated copper wire wrapping layer, and the second insulating layer 154 may be, but not limited to, a polyvinyl chloride insulating layer. The exposed inner conductor 151 may be electrically connected to the second radiator 13 and the exposed outer conductor 153 may be electrically connected to the first radiator 12 by welding (that is, the exposed inner conductor 151 may be electrically connected to the second radiator 13 and the exposed outer conductor 153 may be electrically connected to the first radiator 12 by welding metal 50).

The balun line 16 has a serpentine structure and is disposed on the first surface 111, one end of the balun line 16 is connected to the first radiator 12, and the other end of the balun line 16 is connected to the second radiator 13. The balun line 16 is a meandering metal line and has a balun feeding structure, which is used to achieve good high-frequency and low-frequency matching to reduce the size of the dual-band dipole antenna 1.

The first radiator 12, the second radiator 13 and the coupled radiator 14 are configured to generate a first resonance mode, a second resonance mode and a third resonance mode, the frequency of the first resonance mode is less than the frequency of the second resonance mode, and the frequency of the second resonance mode is less than the frequency of the third resonance mode. For example, the frequency of the first resonance mode may be, but is not limited to, less than 2.4 GHz to 2.45 GHz, the frequency of the second resonance mode may be, but is not limited to, 5 GHz to 5.5 GHZ, and the frequency of the third resonance mode may be, but is not limited to, 5.5 GHZ to 5.9 GHZ.

In one embodiment, the first radiator 12, the second radiator 13 and the coupled radiator 14 may be planar structures respectively. Specifically, the first radiator 12 may be a planar structure formed by splicing a trapezoid with a missing corner 121 and a rectangle with a missing corner 122, the first radiator 12 is provided with a first arc-shaped notch 123 and a second arc-shaped notch 124, and the first arc-shaped notch 123 and the second arc-shaped notch 124 are asymmetrically arranged on opposite sides 125 and 126 of the first radiator 12. The second radiator 13 may be a planar structure formed by splicing an L-shaped radiator 131 and a U-shaped radiator 132, a long-side radiating section 1312 of the L-shaped radiator 131 is connected to a side radiating section 1321 of the U-shaped radiator 132, and a short side radiating section 1311 of the L-shaped radiator 131 extends toward the first radiator 12 to form the coupled radiator 14. The coupled radiator 14 is a radiator that gradually narrows toward the first radiator 12, but this embodiment is not used to limit the present disclosure. For example, the first radiator 12, the second radiator 13 and/or the coupled radiator 14 may be three-dimensional structures; that is, in addition to the planar structure(s) disposed on the first surface 111, the first radiator 12, the second radiator 13 and/or the coupled radiator 14 may further comprise radiating branch(es) extending in a direction away from the first surface 111.

Since the first radiator 12, the second radiator 13 and the coupled radiator 14 may be planar structures, the first radiator 12, the second radiator 13 and the coupled radiator 14 may be disposed on the same surface of the dielectric carrier 11, and the first radiator 12, the second radiator 13 and the coupled radiator 14 may all be made of metal materials, the first radiator 12, the second radiator 13 and the coupled radiator 14 may be arranged on the first surface 111 by patching or printing, which is easy to process.

In one embodiment, the first radiator 12 may be the planar structure formed by splicing a trapezoid with a missing corner 121 and a rectangle with a missing corner 122, the rectangle with the missing corner 122 extends from the missing corner of the trapezoid with the missing corner 121, the first radiator 12 is provided with the first arc-shaped notch 123 and the second arc-shaped notch 124, the first arc-shaped notch 123 and the second arc-shaped notch 124 are asymmetrically arranged on opposite sides 125 and 126 of the first radiator 12 (i.e., the upper base and the lower base of the trapezoid with the missing corner 121), a width W1 of the first arc-shaped notch 123 is smaller than a width W2 of the second arc-shaped notch 124, a length of the side 125 (i.e., the upper base of the trapezoid with the missing corner 121) provided with the first arc-shaped notch 123 is smaller than a length of the side 126 (i.e., the lower base of the trapezoid with the missing corner 121) provided with the second arc-shaped notch 124, and the first arc-shaped notch 123 and the second arc-shaped notch 124 can be configured to adjust the frequency of the second resonance mode.

Figure 4:
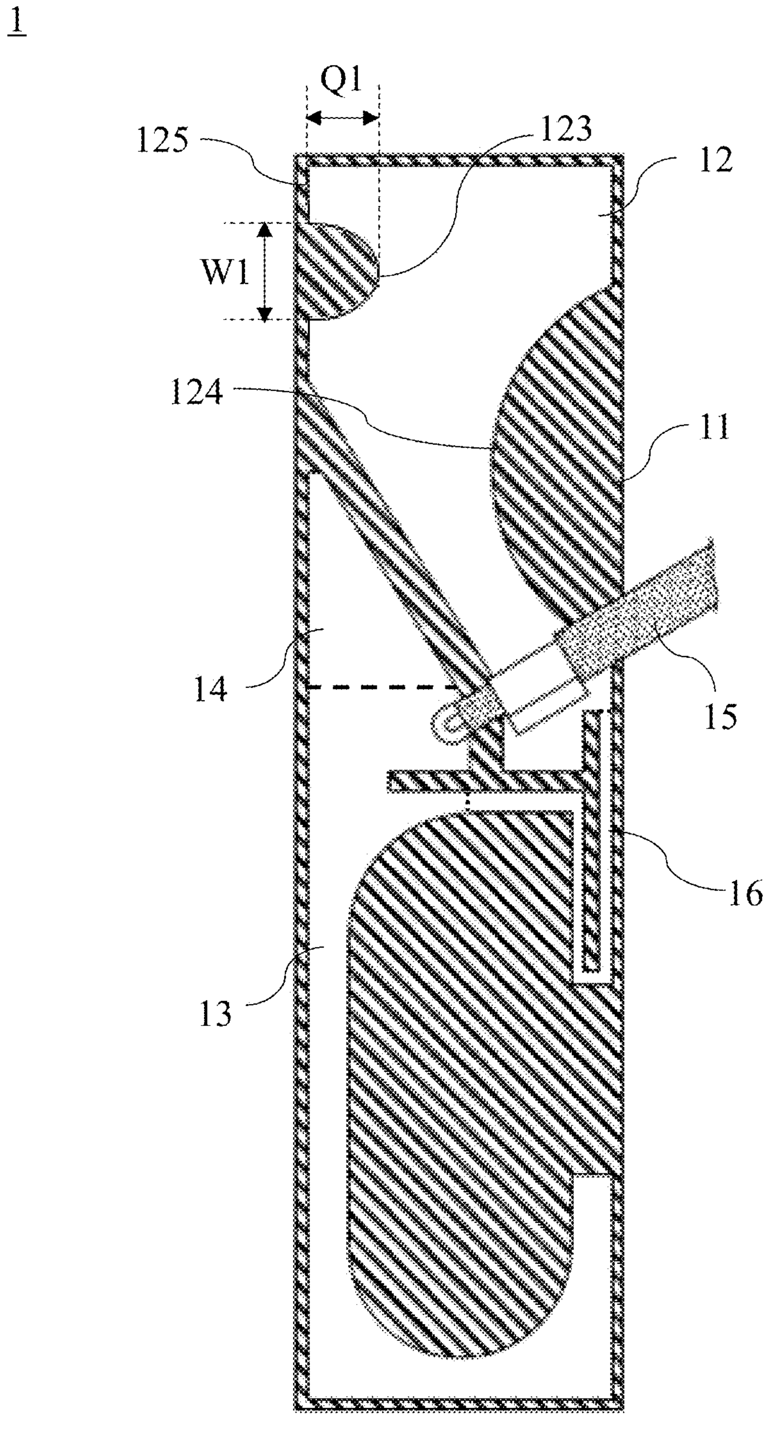
FIG. 4 and FIG. 5 are schematic diagrams of embodiments of the dual-band dipole antenna of FIG. 2 with different first arc-shaped notches.
Figure 5:
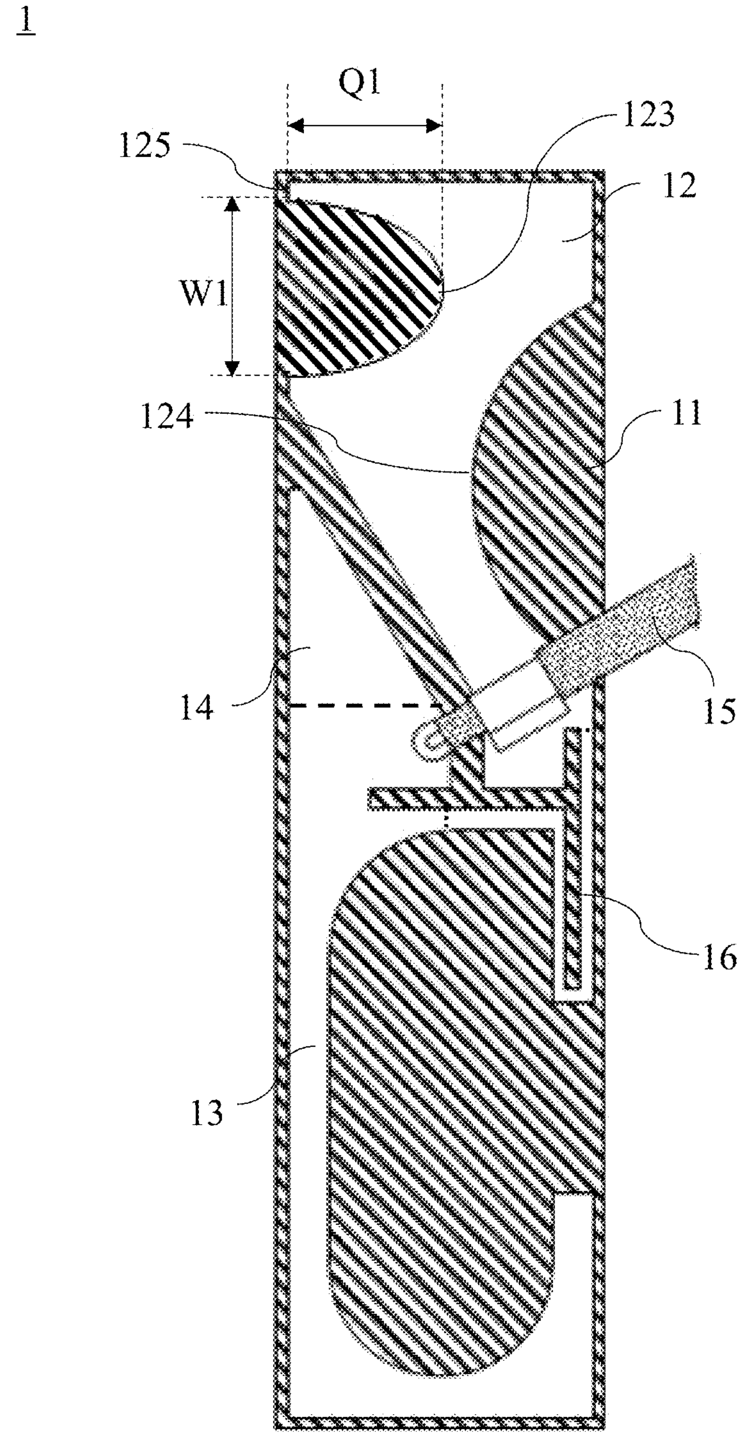
Figure 6:
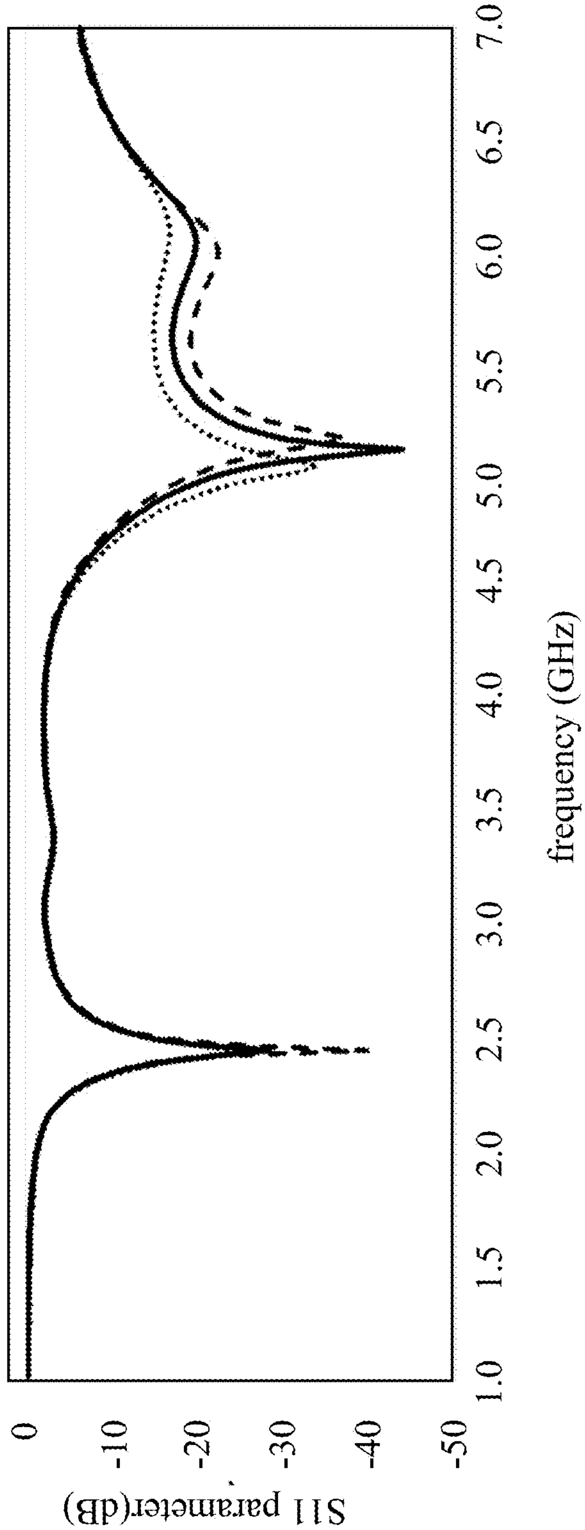
FIG. 6 is a graph illustrating S-parameter curves of the dual-band dipole antennas of FIG. 2, FIG. 4 and FIG. 5.

Please refer to FIG. 2 and FIG. 4 to FIG. 6, wherein FIG. 4 and FIG. 5 are schematic diagrams of embodiments of the dual-band dipole antenna of FIG. 2 with different first arc-shaped notches, FIG. 6 is a graph illustrating S-parameter curves of the dual-band dipole antennas of FIG. 2, FIG. 4 and FIG. 5, the horizontal axis of FIG. 6 represents the frequency in GHz, the vertical axis of FIG. 6 represents the S11 parameter in dB, the dotted line is the S-parameter curve of the dual-band dipole antenna 1 of FIG. 4, the solid line is the S-parameter curve of the dual-band dipole antenna 1 of FIG. 2, and the dotted line is the S-parameter curve of the dual-band dipole antenna 1 of FIG. 5. As shown in FIG. 2 and FIG. 4 to FIG. 6, it can be clearly seen that a depth Q1 of the first arc-shaped notch 123 and a width W1 of the first arc-shaped notch 123 can be configured to adjust the frequency of the second resonance mode.

Figure 7:
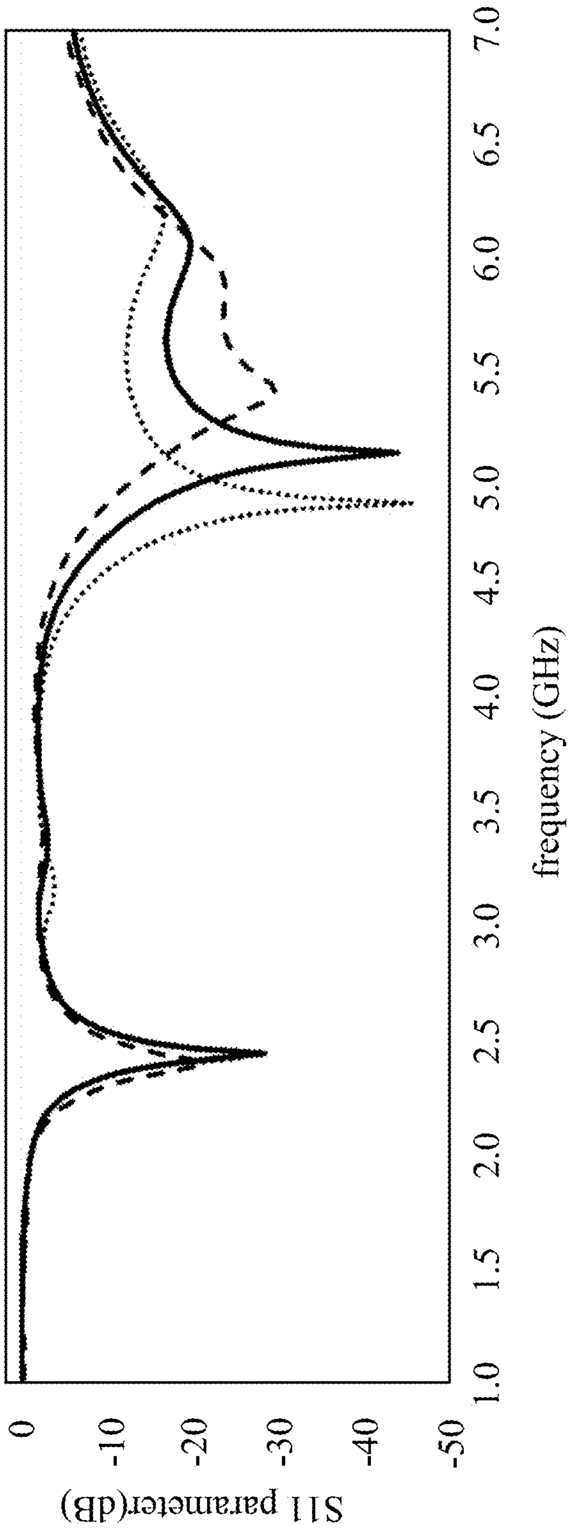
FIG. 7 is a graph illustrating S-parameter curves of the dual-band dipole antenna of FIG. 2 with different second arc-shaped notches.

Please refer to FIG. 2 and FIG. 7, wherein FIG. 7 is a graph illustrating S-parameter curves of the dual-band dipole antenna of FIG. 2 with different second arc-shaped notches, the horizontal axis of FIG. 7 represents frequency in GHz, the vertical axis of FIG. 7 represents S11 parameter in dB, the dotted line is the S parameter curve of the dual-band dipole antenna 1 of FIG. 2 when the depth Q2 of the second arc-shaped notch 124 is 1.5 mm, the solid line is the S parameter curve of the dual-band dipole antenna 1 of FIG. 2 when the depth Q2 of the second arc-shaped notch 124 is 3 mm, and the dotted line is the S parameter curve of the dual-band dipole antenna 1 of FIG. 2 when the depth Q2 of the second arc-shaped notch 124 is 4.5 mm. As shown in FIG. 2 and FIG. 7, it can be clearly seen that the depth Q2 of the second arc-shaped notch 124 can be configured to adjust the frequency of the second resonance mode.

In one embodiment, the second radiator 13 may comprise an L-shaped radiator 131 and a U-shaped radiator 132, the L-shaped radiator 131 comprises a short-side radiating section 1311 and a long-side radiating section 1312, the U-shaped radiator 132 comprises two side radiating sections 1321 parallel to each other and a bottom radiating section 1322 connecting the two side radiating sections 1321, the long-side radiating section 1312 of the L-shaped radiator 131 is connected to the side radiating section 1321 of the U-shaped radiator 132, and the short-side radiating section 1311 of the L-shaped radiator 131 extends toward the first radiator 12 to form the coupled radiator 14.

Figure 8:
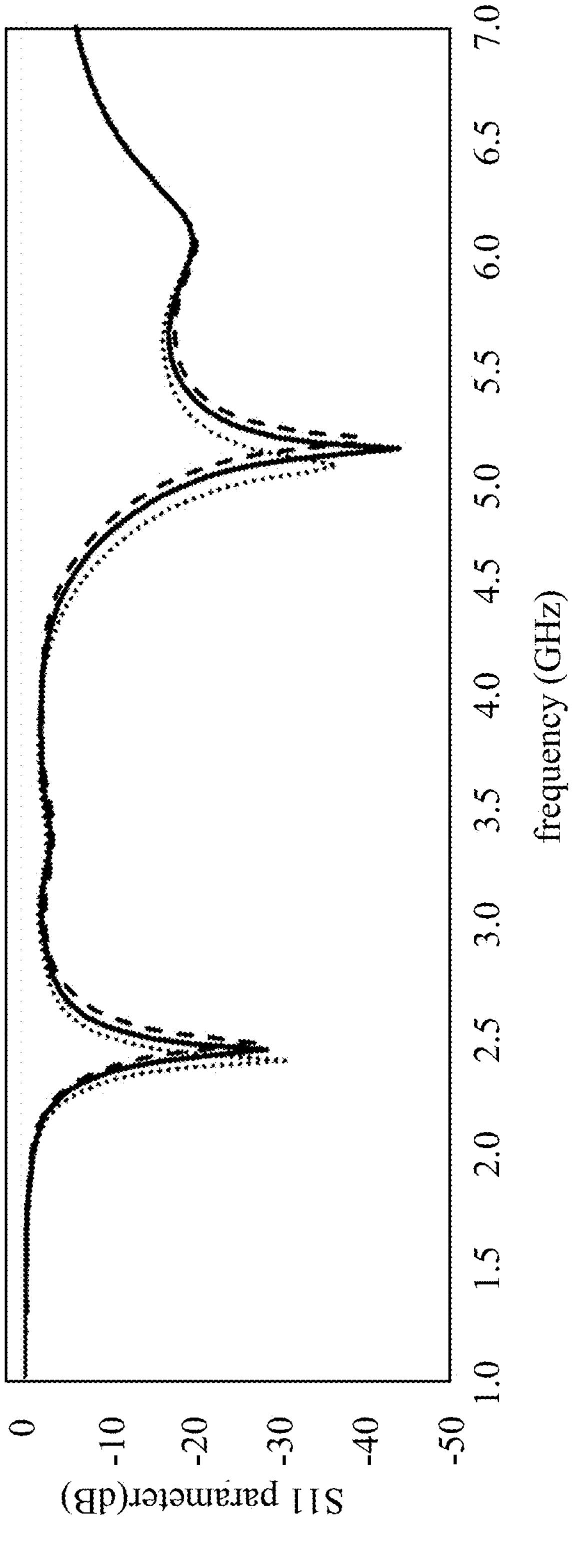
FIG. 8 is a graph illustrating S-parameter curves of the dual-band dipole antenna of FIG. 2 with side radiating sections of different lengths.

Please refer to FIG. 2 and FIG. 8, wherein FIG. 8 is a graph illustrating S-parameter curves of the dual-band dipole antenna of FIG. 2 with side radiating sections of different lengths, the horizontal axis of FIG. 8 represents frequency in GHz, the vertical axis of FIG. 8 represents S11 parameter in dB, the dotted line is the S parameter curve of the dual-band dipole antenna 1 when the length L1 of the side radiating section 1321 not connected to the long-side radiating section 1312 is 3.5 mm, the solid line is the S parameter curve of the dual-band dipole antenna 1 when the length L1 of the side radiating section 1321 not connected to the long-side radiating section 1312 is 4.5 mm, and the dotted line is the S parameter curve of the dual-band dipole antenna 1 when the length L1 of the side radiating section 1321 not connected to the long-side radiating section 1312 is 5.5 mm. As shown in FIG. 2 and FIG. 8, it can be clearly seen that the length L1 of the side radiating section 1321 of the U-shaped radiator 132 that is not connected to the long-side radiating section 1312 can be configured to adjust the frequencies of the first resonance mode and the second resonance mode.

In one embodiment, the coupled radiator 14 may be a radiator that gradually narrows toward the first radiator 12.

Figure 9:
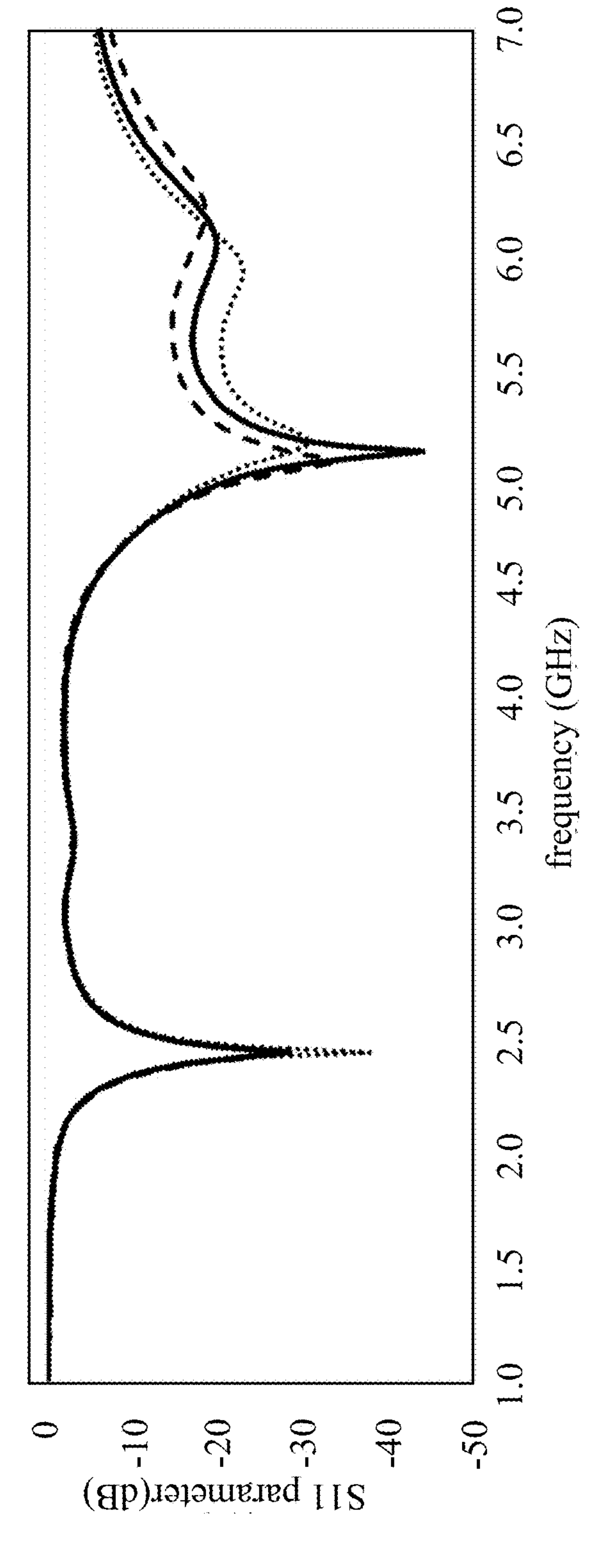
FIG. 9 is a graph illustrating S-parameter curves of the dual-band dipole antenna of FIG. 2 with coupled radiators of different lengths.

Please refer to FIG. 2 and FIG. 9, wherein FIG. 9 is a graph illustrating S-parameter curves of the dual-band dipole antenna of FIG. 2 with coupled radiators of different lengths, the horizontal axis of FIG. 9 represents the frequency in GHz, the vertical axis of FIG. 9 represents the S11 parameter in dB, the dotted line is the S parameter curve of the dual-band dipole antenna 1 when the length L2 of the coupled radiator 14 of FIG. 2 is 6.4 mm, the solid line is the S parameter curve of the dual-band dipole antenna 1 when the length L2 of the coupled radiator 14 of FIG. 2 is 5.9 mm, and the dotted line is the S parameter curve of the dual-band dipole antenna 1 when the length L2 of the coupled radiator 14 of FIG. 2 is 5.4 mm. As shown in FIG. 2 and FIG. 9, it can be clearly seen that the length L2 of the coupled radiator 14 extending toward the first radiator 12 can be configured to adjust the frequency of the third resonance mode.

In one embodiment, the coupled radiator 14 can be a trapezoidal radiator, and there is the coupling slot D between the waist of the trapezoidal radiator and the first radiator 12.

In one embodiment, the first radiator 12 may be provided with a missing corner 127 (i.e., the missing corner 127 of the rectangle with the missing corner 122), the second radiator 13 may be provided with a notch 133 (i.e., the short-side radiation section 1311 is provided with the notch 133), one end of the balun line 16 is connected to the missing corner 127 of the first radiator 12, and the other end of the balun line 16 is connected to the second radiator 13 and adjacent to the notch 133.

Figure 10:
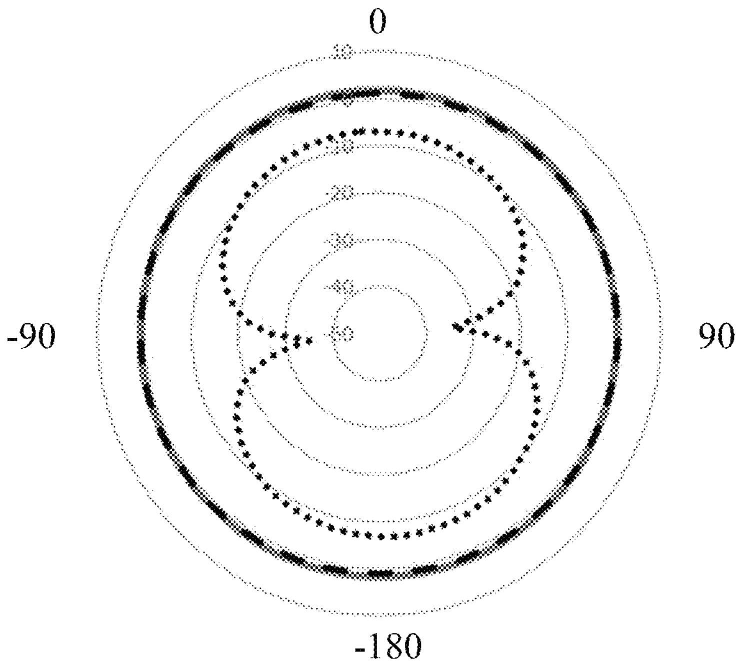
FIG. 10 is a schematic diagram of a radiation pattern of the dual-band dipole antenna of FIG. 2 in the XOY plane at 2.45 GHz frequency band.
Figure 11:
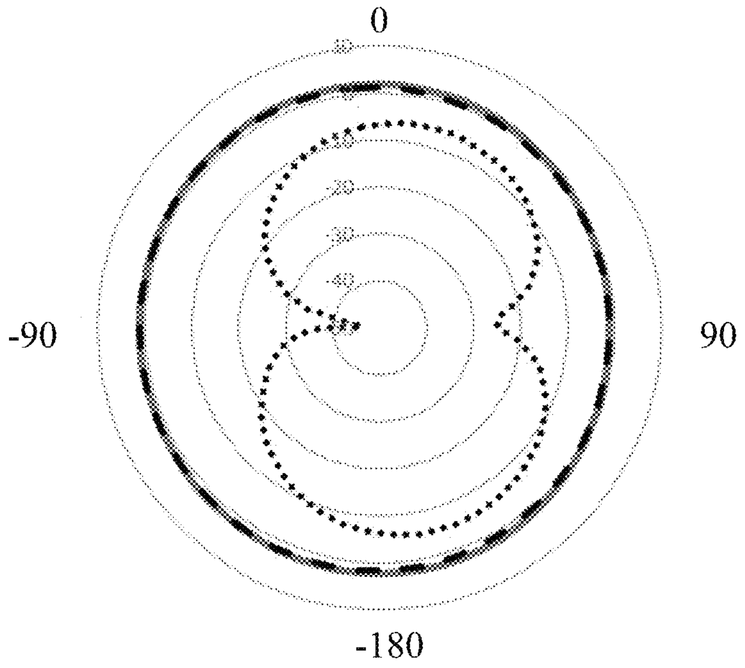
FIG. 11 is a schematic diagram of a radiation pattern of the dual-band dipole antenna of FIG. 2 in the XOY plane at 5.5 GHz frequency band.

Please refer to FIG. 10 and FIG. 11, wherein FIG. 10 is a schematic diagram of a radiation pattern of the dual-band dipole antenna of FIG. 2 in the XOY plane at 2.45 GHz frequency band, FIG. 11 is a schematic diagram of a radiation pattern of the dual-band dipole antenna of FIG. 2 in the XOY plane at 5.5 GHz frequency band, the thick dashed line is the Theta radiation pattern (i.e. vertical polarization radiation), the thin dashed line is the Phi radiation pattern (i.e. horizontal polarization radiation), the thin solid line is the comprehensive (Total) radiation pattern, and the Theta radiation pattern is almost the same as the comprehensive radiation pattern. As shown in FIG. 10 and FIG. 11, it can be clearly seen that the high-frequency radiation pattern and the low-frequency radiation pattern of the dual-band dipole antenna 1 are both asymmetric radiation patterns.

Figure 12:
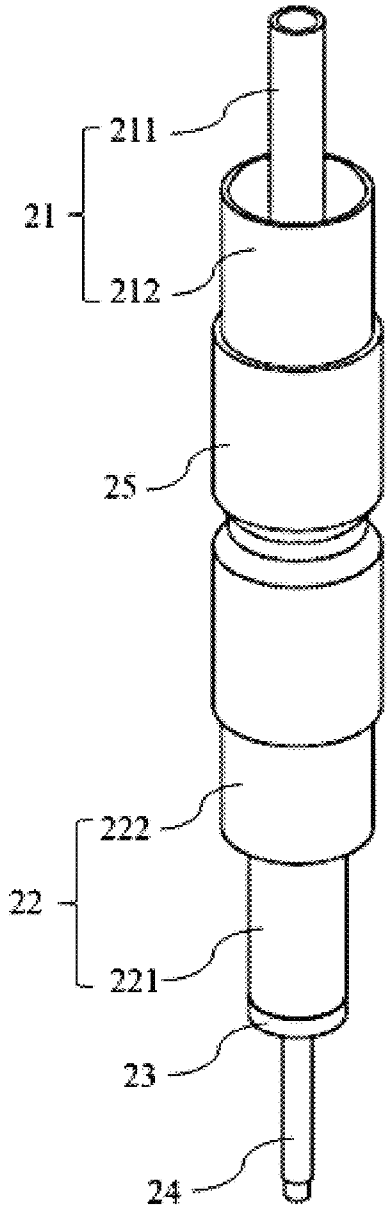
FIG. 12 (Prior Art)
FIG. 12 is a stereoscopic diagram of an existing dipole antenna with dual-band operation characteristics.
Figure 13:
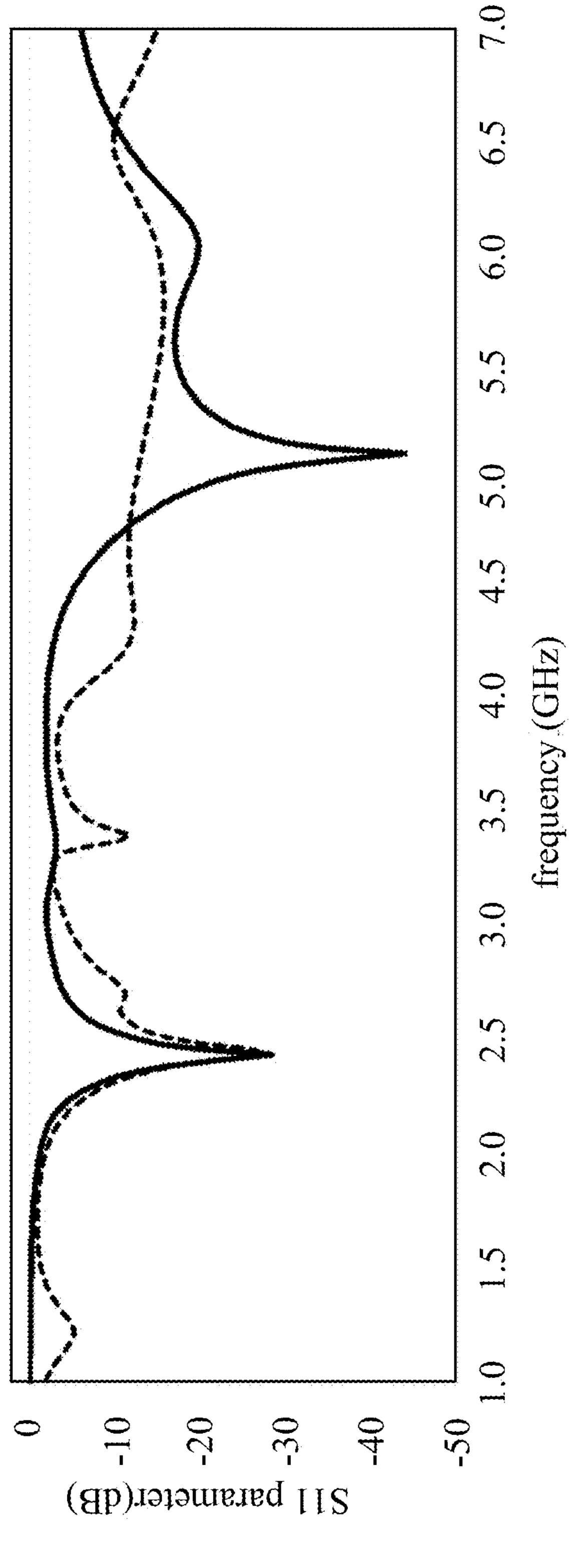
FIG. 13 is a graph illustrating S-parameter curves of the dual-band dipole antenna of FIG. 1 and the dipole antenna of FIG. 12.
Figure 14:
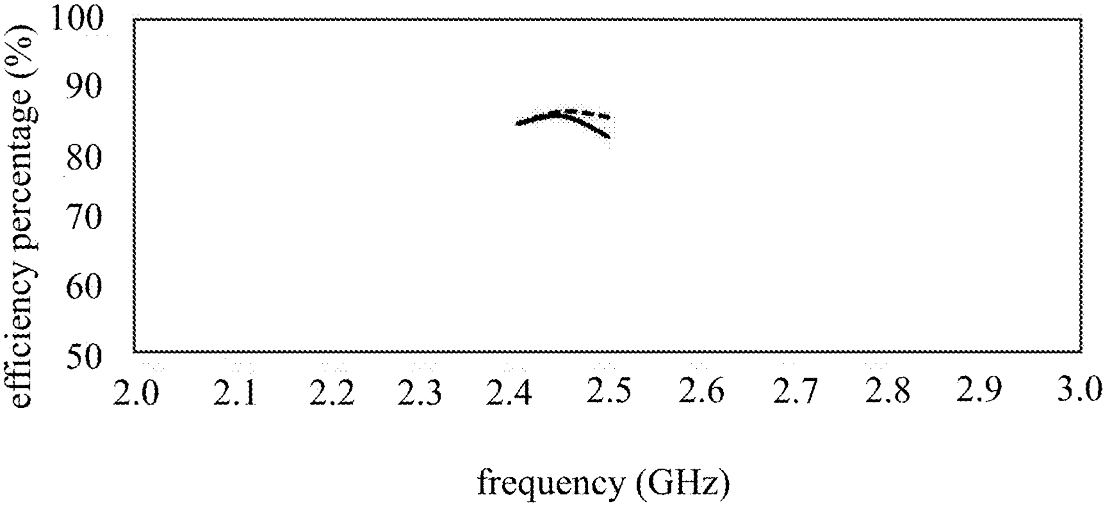
FIG. 14 is a graph illustrating antenna efficiency of the dual-band dipole antenna of FIG. 1 and the dipole antenna of FIG. 12 at 2.45 GHz frequency band.
Figure 15:
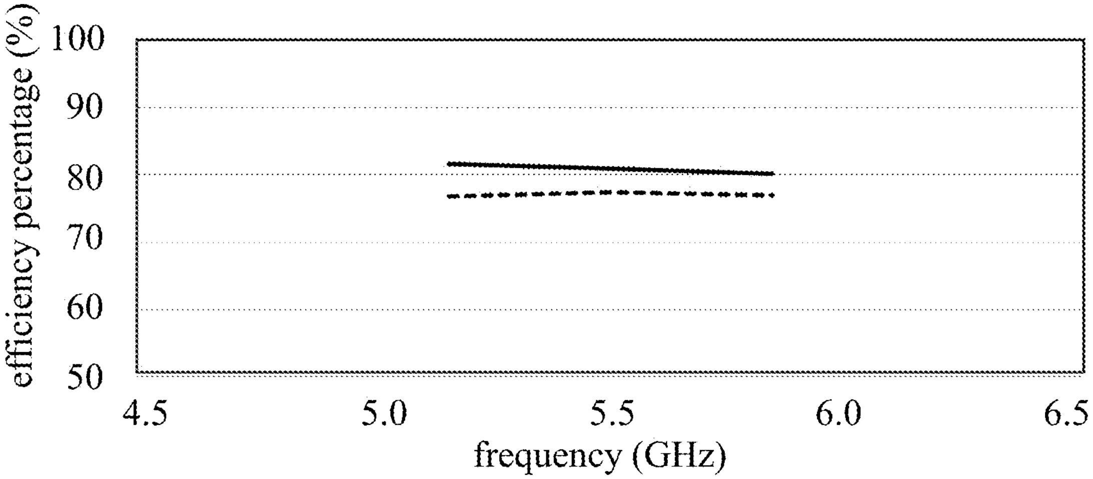
FIG. 15 is a graph illustrating antenna efficiency of the dual-band dipole antenna of FIG. 1 and the dipole antenna of FIG. 12 at 5.5 GHz frequency band.

Please refer to FIG. 12 to FIG. 15, wherein FIG. 12 is a stereoscopic diagram of an existing dipole antenna with dual-band operation characteristics; FIG. 13 is a graph illustrating S-parameter curves of the dual-band dipole antenna of FIG. 1 and the dipole antenna of FIG. 12, the horizontal axis represents frequency in GHz, the vertical axis represents S11 parameter in dB, the dotted line is the S parameter curve of the dipole antenna of FIG. 12, and the solid line is the S parameter curve of the dual-band dipole antenna of FIG. 1; FIG. 14 is a graph illustrating antenna efficiency of the dual-band dipole antenna of FIG. 1 and the dipole antenna of FIG. 12 at 2.45 GHz frequency band; and FIG. 15 is a graph illustrating antenna efficiency of the dual-band dipole antenna of FIG. 1 and the dipole antenna of FIG. 12 at 5.5 GHz frequency band, the horizontal axes of FIG. 14 and FIG. 15 represent frequency in GHz, the vertical axes of FIG. 14 and FIG. 15 represent efficiency percentage, the dotted line is the antenna efficiency curve of the dipole antenna 2 of FIG. 12, and the solid line is the antenna efficiency curve of the dual-band dipole antenna 1 of FIG. 1.

As shown in FIG. 12, the dipole antenna 2 (i.e., a dual-band dipole antenna of symmetrical design) comprises a first radiation tube body 21 and a second radiation tube body 22 arranged at intervals, a fixing ring 23, a coaxial cable 24, and a heat shrink tube 25, wherein the coaxial cable 24 passes through the second radiation tube body 22 and protrudes from the second radiation tube body 22; an inner conductor of the coaxial cable 24 is electrically connected to the first radiation tube body 21, and an outer conductor of the coaxial cable 24 is electrically connected to the second radiation tube body 22, so that a first radiation portion 211 of the first radiation tube body 21 and a second radiation portion 221 of the second radiation tube body 22 generate a low-frequency (i.e., 2.45 GHz frequency band) resonance mode, and a third radiation portion 212 of the first radiation tube body 21 and a fourth radiation portion 222 of the second radiation tube body 22 generate a high-frequency (i.e., 5.5 GHz frequency band) resonance mode; the fixing ring 23 is configured to fix the coaxial cable 24 and the second radiation tube body 22; the heat shrink tube 25 is configured to fix the first radiation tube body 21 and the second radiation tube body 22 arranged at intervals, and to prevent the electrical connections between the coaxial cable 24 and the second radiation tube body 22 and between the coaxial cable 24 and the first radiation tube body 21 from breaking.

In some embodiments, the overall length of the dipole antenna 2 of FIG. 12 can be 55 mm, and the overall length of the dual-band dipole antenna 1 of FIG. 1 can be 31 mm. It can be seen that the overall length of the dipole antenna 2 is greater than the overall length of the dual-band dipole antenna 1 (that is, the length of the dual-band dipole antenna 1 can be reduced by about 43% compared with the length of the dipole antenna 2).

As shown in FIG. 13 to FIG. 15, it can be clearly seen that the antenna efficiencies of the dual-band dipole antenna 1 and the dipole antenna 2 at 2.45 GHz frequency band and 5.5 GHZ frequency band are similar, but the return losses of the dual-band dipole antenna 1 at 2.45 GHz and 5.15 GHz are greater than the return losses of the dipole antenna 2 at 2.45 GHz and 5.15 GHz.

Figure 16:
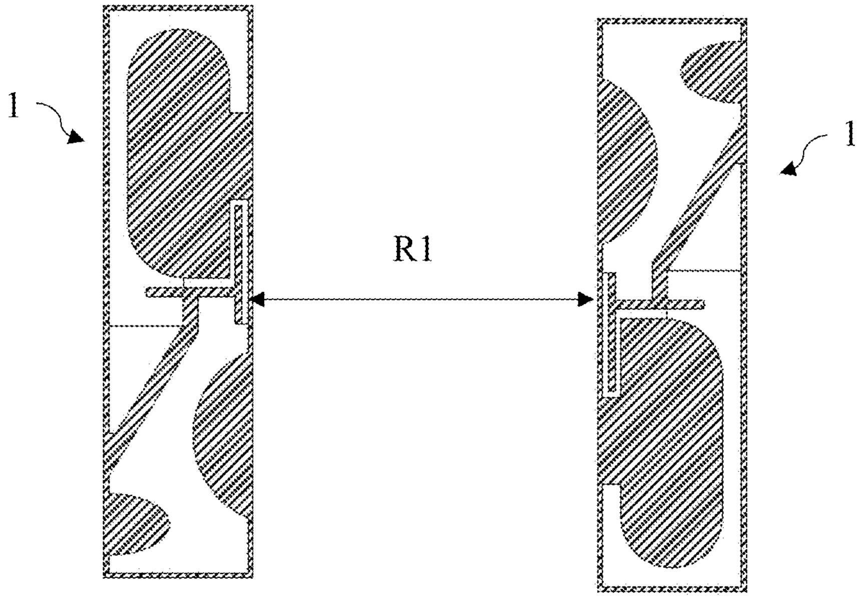
FIG. 16 is a schematic configuration diagram of two dual-band dipole antennas of an electronic device according to an embodiment of the present disclosure.
Figure 17:
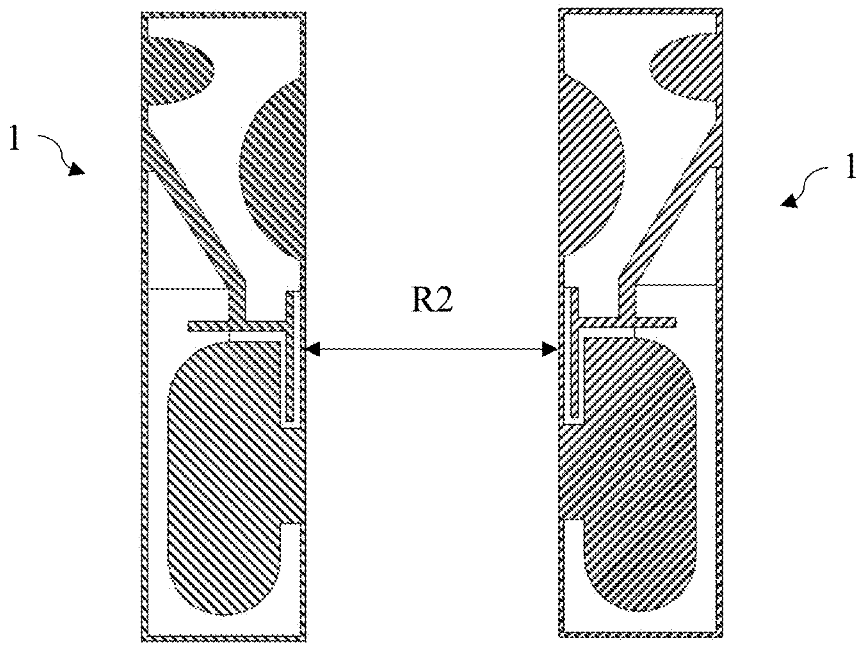
FIG. 17 is a schematic configuration diagram of two dual-band dipole antennas of an electronic device according to another embodiment of the present disclosure.

Please refer to FIG. 16 and FIG. 17, wherein FIG. 16 is a schematic configuration diagram of two dual-band dipole antennas of an electronic device according to an embodiment of the present disclosure, and FIG. 17 is a schematic configuration diagram of two dual-band dipole antennas of an electronic device according to another embodiment of the present disclosure. As shown in FIG. 16 and FIG. 17, an electronic device 3 comprises two dual-band dipole antennas 1, wherein one dual-band dipole antenna 1 is rotated 180 degrees relative to the other dual-band dipole antenna 1 (as shown in FIG. 16), or the structures of the two dual-band dipole antennas 1 are arranged in a mirror image (as shown in FIG. 17).

In addition, when the structures of the two dual-band dipole antennas 1 are arranged in a mirror image, a first distance R1 between the two dual-band dipole antennas 1 can meet the isolation requirement; when one dual-band dipole antenna 1 is rotated 180 degrees relative to the other dual-band dipole antenna 1, a second distance R2 between the two dual-band dipole antennas 1 can meet the isolation requirement, and the second distance R2 can be less than the first distance R1.

Figure 18:
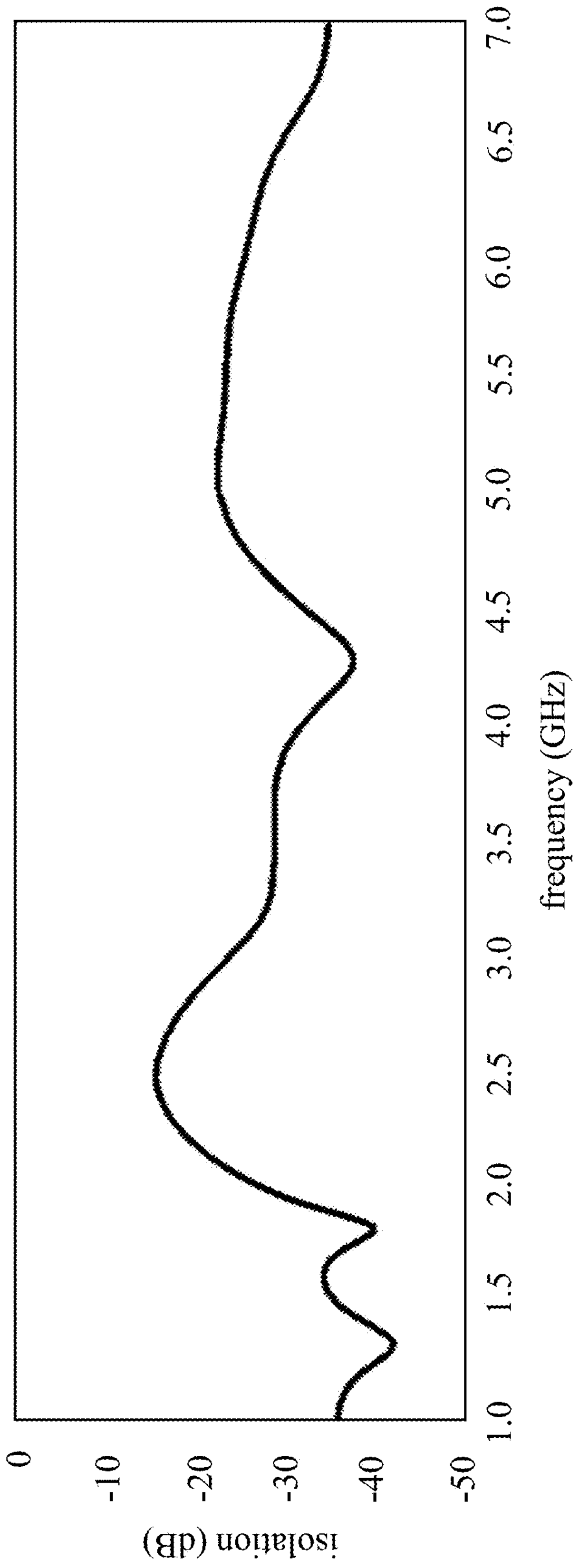
FIG. 18 is a graph illustrating the isolation between two dual-band dipole antennas when a first distance of FIG. 16 is 60 mm.
Figure 19:
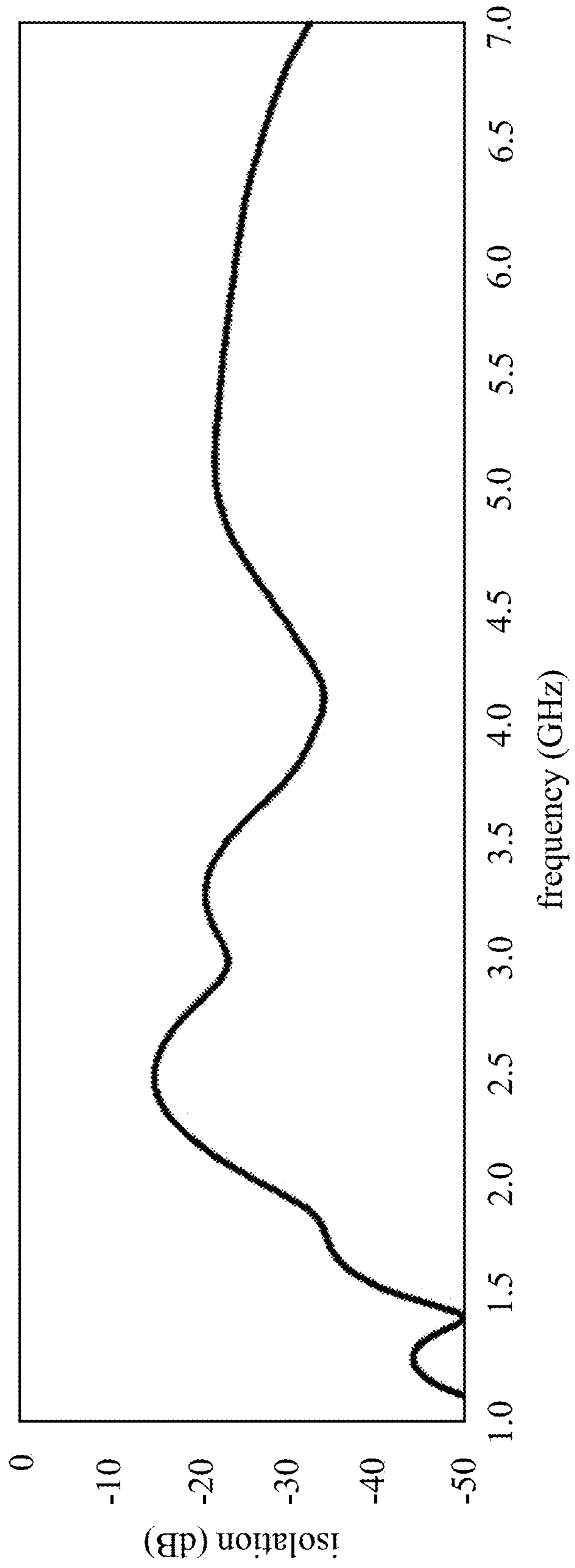
FIG. 19 is a graph illustrating the isolation between two dual-band dipole antennas when a second distance of FIG. 17 is 50 mm.
Figure 20:
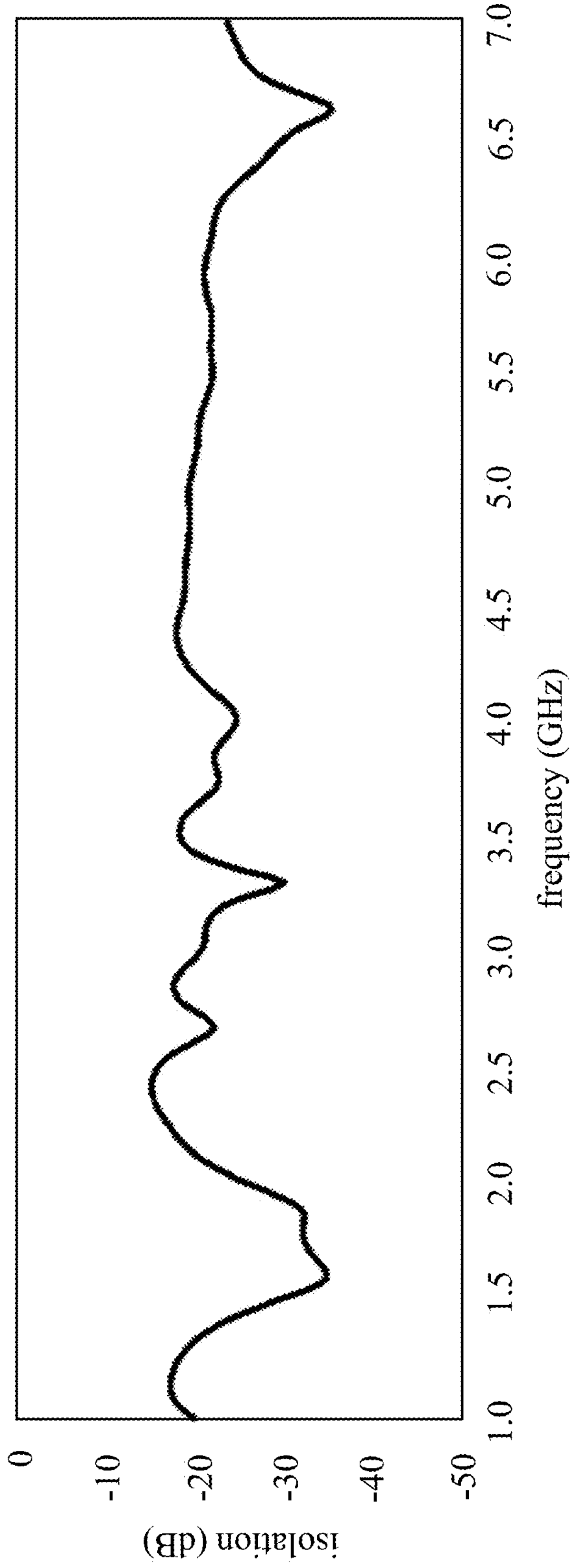
FIG. 20 (Prior Art)
FIG. 20 is a graph illustrating the isolation between two dipole antennas when an antenna spacing distance of the dipole antennas of FIG. 12 is 60 mm.

Please refer to FIG. 18 to FIG. 20, wherein FIG. 18 is a graph illustrating the isolation between two dual-band dipole antennas when a first distance of FIG. 16 is 60 mm, FIG. 19 is a graph illustrating the isolation between two dual-band dipole antennas when a second distance of FIG. 17 is 50 mm, and FIG. 20 is a graph illustrating the isolation between two dipole antennas when an antenna spacing distance of the dipole antennas of FIG. 12 is 60 mm, the horizontal axes of FIG. 18 to FIG. 20 represent frequency in GHz, and the vertical axes of FIG. 18 to FIG. 20 represent isolation in dB. As shown in FIG. 18 to FIG. 20, it can be clearly seen that by flipping the structure of the dual-band dipole antenna 1 up and down and/or left and right, the dual-band dipole antenna 1 can meet the isolation requirement by different antenna spacing distances; the dual-band dipole antenna 1 can meet the isolation requirement with a shorter antenna spacing distance compared to the dipole antenna 2.

In summary, by the asymmetric structural design of the first radiator, the second radiator and the coupled radiator, the dual-band dipole antenna has an asymmetric radiation pattern at high frequency and low frequency. At the same time, by the serpentine structure of the balun line, good high-frequency and low-frequency matching is achieved, and the size of the dual-band dipole antenna is greatly reduced. In addition, by flipping the structure of the dual-band dipole antenna up and down and/or left and right, when the dual-band dipole antenna is applied to an electronic device with a multi-antenna architecture, the dual-band dipole antenna of the present disclosure can meet the isolation requirement with a shorter antenna spacing distance compared to the dual-band dipole antenna with a symmetrical design.

While the present disclosure is disclosed in the foregoing embodiments, it should be noted that these descriptions are not intended to limit the present disclosure. On the contrary, the present disclosure covers modifications and equivalent arrangements obvious to those skilled in the art. Therefore, the scope of the claims must be interpreted in the broadest manner to comprise all obvious modifications and equivalent arrangements.

What is claimed is:

1. A dual-band dipole antenna, comprising:

a dielectric carrier comprising a first surface;

a first radiator and a second radiator disposed in opposite areas of the first surface and having different structural shapes;

a coupled radiator disposed on the first surface and extending from the second radiator toward the first radiator, wherein there is a coupling slot between the coupled radiator and the first radiator;

a coaxial cable comprising an inner conductor, a first insulating layer, an outer conductor and a second insulating layer, wherein the first insulating layer covers a portion of a surface of the inner conductor, so that one end of the inner conductor is exposed, and the exposed inner conductor is electrically connected to the second radiator; the outer conductor covers a portion of a surface of the first insulating layer; the second insulating layer covers a portion of a surface of the outer conductor, so that a portion of the outer conductor is exposed, and the exposed outer conductor is electrically connected to the first radiator; and a balun line having a serpentine structure and disposed on the first surface, wherein one end of the balun line is connected to the first radiator, and the other end of the balun line is connected to the second radiator;

wherein the first radiator, the second radiator and the coupled radiator are configured to generate a first resonance mode, a second resonance mode and a third resonance mode.

2. The dual-band dipole antenna according to claim 1, wherein the first radiator is provided with a first arc-shaped notch and a second arc-shaped notch, the first arc-shaped notch and the second arc-shaped notch are asymmetrically arranged on opposite sides of the first radiator, a width of the first arc-shaped notch is smaller than a width of the second arc-shaped notch, a length of a side provided with the first arc-shaped notch is smaller than a length of a side provided with the second arc-shaped notch, and the first arc-shaped notch and the second arc-shaped notch are configured to adjust a frequency of the second resonance mode.

3. The dual-band dipole antenna according to claim 2, wherein a depth of the first arc-shaped notch and the width of the first arc-shaped notch are configured to adjust the frequency of the second resonance mode.

4. The dual-band dipole antenna according to claim 2, wherein a depth of the second arc-shaped notch is configured to adjust the frequency of the second resonance mode.

5. The dual-band dipole antenna according to claim 1, wherein the second radiator comprises an L-shaped radiator and a U-shaped radiator, a long-side radiating section of the L-shaped radiator is connected to a side radiating section of the U-shaped radiator, a short side radiating section of the L-shaped radiator extends toward the first radiator to form the coupled radiator, and a length of the other side radiating section of the U-shaped radiator that is not connected to the long-side radiating section is configured to adjust frequencies of the first resonance mode and the second resonance mode.

6. The dual-band dipole antenna according to claim 1, wherein the coupled radiator is a radiator that gradually narrows toward the first radiator, and a length of the coupled radiator extending toward the first radiator is configured to adjust a frequency of the third resonance mode.

7. The dual-band dipole antenna according to claim 6, wherein the coupled radiator is a trapezoidal radiator, and there is the coupling slot between a waist of the trapezoidal radiator and the first radiator.

8. The dual-band dipole antenna according to claim 1, wherein the dielectric carrier is a flexible board or a rigid board.

9. The dual-band dipole antenna according to claim 1, wherein the dielectric carrier is a single-sided board.

10. The dual-band dipole antenna according to claim 1, wherein the first radiator has a missing corner, the second radiator is provided with a notch, one end of the balun line is connected to the missing corner of the first radiator, and the other end of the balun line is connected to the second radiator and adjacent to the notch.

11. An electronic device, comprising: two dual-band dipole antennas according to claim 1, wherein one of the dual-band dipole antennas is rotated 180 degrees relative to the other dual-band dipole antenna, or the structures of the two dual-band dipole antennas are arranged in a mirror image.

12. The electronic device according to claim 11, wherein when the structures of the two dual-band dipole antennas are arranged in the mirror image, the two dual-band dipole antennas are separated by a first distance; when one of the dual-band dipole antennas is rotated 180 degrees relative to the other dual-band dipole antenna, the two dual-band dipole antennas are separated by a second distance; the second distance is smaller than the first distance.

13. The electronic device according to claim 11, wherein the first radiator is provided with a first arc-shaped notch and a second arc-shaped notch, the first arc-shaped notch and the second arc-shaped notch are asymmetrically arranged on opposite sides of the first radiator, a width of the first arc-shaped notch is smaller than a width of the second arc-shaped notch, a length of a side provided with the first arc-shaped notch is smaller than a length of a side provided with the second arc-shaped notch, and the first arc-shaped notch and the second arc-shaped notch are configured to adjust a frequency of the second resonance mode.

14. The electronic device according to claim 13, wherein a depth of the first arc-shaped notch and the width of the first arc-shaped notch are configured to adjust the frequency of the second resonance mode.

15. The electronic device according to claim 13, wherein a depth of the second arc-shaped notch is configured to adjust the frequency of the second resonance mode.

16. The electronic device according to claim 11, wherein the second radiator comprises an L-shaped radiator and a U-shaped radiator, a long-side radiating section of the L-shaped radiator is connected to a side radiating section of the U-shaped radiator, a short side radiating section of the L-shaped radiator extends toward the first radiator to form the coupled radiator, and a length of the other side radiating section of the U-shaped radiator that is not connected to the long-side radiating section is configured to adjust frequencies of the first resonance mode and the second resonance mode.

17. The electronic device according to claim 11, wherein the coupled radiator is a radiator that gradually narrows toward the first radiator, and a length of the coupled radiator extending toward the first radiator is configured to adjust a frequency of the third resonance mode.

18. The electronic device according to claim 17, wherein the coupled radiator is a trapezoidal radiator, and there is the coupling slot between a waist of the trapezoidal radiator and the first radiator.

19. The electronic device according to claim 11, wherein the first radiator has a missing corner, the second radiator is provided with a notch, one end of the balun line is connected to the missing corner of the first radiator, and the other end of the balun line is connected to the second radiator and adjacent to the notch.

20. The electronic device according to claim 11, wherein the dielectric carrier is a single-sided board.

* * * * *